United States Patent [19]
Yamazaki et al.

[11] Patent Number: 5,436,516
[45] Date of Patent: Jul. 25, 1995

[54] INERTIAL DEVICE FOR ENERGY STORAGE

[75] Inventors: Shunpei Yamazaki, Tokyo; Yasuhiko Takemura; Hisashi Ohtani, both of Kanagawa, all of Japan

[73] Assignee: Semiconductor Energy Laboratory Co., Ltd., Kanagawa, Japan

[21] Appl. No.: 842,490

[22] Filed: Feb. 27, 1992

[30] Foreign Application Priority Data

Mar. 1, 1991 [JP] Japan .................. 3-057683

[51] Int. Cl.$^6$ .................. H02K 1/02; H02K 7/09; H02K 55/00
[52] U.S. Cl. .................. 310/90.5; 310/156; 322/4; 505/877
[58] Field of Search .................. 310/74, 90.5, 156, 180, 310/268; 322/4; 74/572; 505/877, 909

[56] References Cited

U.S. PATENT DOCUMENTS

| | | | |
|---|---|---|---|
| 3,512,852 | 5/1970 | North | 250/201 |
| 3,741,034 | 6/1973 | Post | 74/572 |
| 4,370,004 | 1/1983 | Morikawa et al. | 310/90.5 |
| 4,406,950 | 9/1983 | Roesel, Jr. | 290/4 C |
| 4,444,444 | 4/1984 | Benedetti et al. | 310/90.5 |
| 4,486,038 | 12/1984 | Bredenkamp | 290/1 R |
| 4,509,006 | 4/1985 | Pinson | 322/4 |
| 4,870,310 | 9/1989 | Triplett | 310/74 |
| 5,065,060 | 11/1991 | Takahashi et al. | 310/74 |
| 5,177,387 | 1/1993 | McMichael et al. | 310/90.5 |
| 5,214,981 | 6/1993 | Weinberger et al. | 74/573 R |
| 5,245,270 | 9/1993 | Akiyama | 322/4 |

*Primary Examiner*—Thomas M. Dougherty
*Assistant Examiner*—D. R. Haszko
*Attorney, Agent, or Firm*—Sixbey, Friedman, Leedom & Ferguson; Gerald J. Ferguson, Jr.; Evan R. Smith

[57] ABSTRACT

An energy storage device which comprises at least a first object having a rotational mechanism which rotates around an axis and a surface which generates a magnetic field; at least a second object comprising a superconductor and having provided separately from said first object but facing said surface which generates a magnetic field; a device which provides a rotational energy to the first object by exerting an electromagnetic reaction to said first object; and a device which converts the rotational energy of the first object into an electric energy; provided that the first object is substantially levitated at its use, and that said first object uses no mechanical support device.

Also claimed are methods of converting energy, which comprise a method of converting an electric or a magnetic energy into a kinetic energy, and a method of converting a rotational energy into an electric energy, said methods taking advantage of flywheels being supported by levitation resulting from the interaction between a magnetic field and a superconductor, and not by a mechanical supporting device.

16 Claims, 9 Drawing Sheets

INERTIAL DEVICE FOR ENERGY STORAGE

BACKGROUND OF THE INVENTION

1. Field of the Invention

The present invention relates to a means for a temporal or a long storage of energy and a method for converting energy, and devices related to the same. More particularly, the present invention provides a means for storing energy and a device related thereto, said means and device being capable of accumulating energy at an extremely high density that has never been achieved to the present.

2. Description of the Prior Art

Though not always consciously enough, mankind has been confronted with the problem of energy storage since the ancient times. The problem of energy storage is closely related to the cyclic turn of day and night, or of winter and summer, which requires cyclic change in the supply and demand of energy.

For example, men have compensated for insufficient heat in cold nights and winters, i.e., when there is only an insufficient supply of solar energy, by converting the energy stored in nature into a convenient form for use by a chemical means such as combustion. More specifically, firewood and the charcoal resulting therefrom are, so to say, storage devices in the form of plant bodies which store the solar energy therein by photosynthesis. Coal and oil, whose consumption is highly increasing with modernization, can find their origin in ancient plants and animals. They store the ancient solar energy in the form of metamorphosed mortal remains of plants and animals.

Lead batteries are means for storing electric energy which have been invented in the nineteenth century, and secondary cells inclusive of lead batteries are all means for storing electric energy by chemical conversion.

Another type of energy storage comprises electrolyzing water and storing hydrogen gas which generates therefrom. Since hydrogen gas can be converted into harmless water upon combustion without producing any other unwanted substances, it has drawn attention recently as a clean energy source. This is a distinguished feature of this energy source as compared with the fossil fuels which are described hereinafter.

The means of energy storage mentioned above unanimously take advantage of a chemical reaction among molecules and atoms. Those means are characterized by that they can store energy at an extremely high density. In general, about $10^{23}$ atoms or molecules are present per 1 cm$^3$. Since each of these atoms and molecules is capable of storing energy in an amount of from about 0.1 to 1 eV of energy per 1 atom or molecule, a theoretical calculation teaches that an energy of from $10^9$ to $10^{10}$ Joule (J) is stored in 1 m$^3$ of those atoms and molecules. Practically, in fact, a liquid hydrogen can store energy at an amount of $1.02 \times 10^{10}$ J/m$^3$. In the case of secondary batteries, the accumulated energy density is about $10^8$ J/m$^3$ for a lead battery. This low density is due to the presence of an electrolyte accounting for a large volume, besides the substance (electrode plates) which participates directly in storing energy.

The aforementioned means for storing energy by taking advantage of a chemical reaction are, however, not suited for drawing out energy in a large amount at one time. In the case of a secondary cell, for example, the maximum amount of energy which is drawn out depends on the surface reaction of the electrode. Other types of chemical energy storage may release the accumulated energy at once by causing an explosion, but it is nearly impossible to efficiently convert the energy into a convenient form such as electric energy.

In addition to the chemical means of storing energy as mentioned above, physical means for the same purpose are also used in various fields. A representative of such physical means comprises dams which are used at hydraulic power plants. A dam stores rainfall which has been produced by a solar energy and the like. In such a case, a potential energy is stored in the form of a large amount of water being stored in a dam. A pumped storage power plant draws up water using the excess electric power during night, and generates electric power by discharging the thus pumped up water in the daytime. In this case, the electric power in the night is stored in the form of a potential energy of the water. The technological concept of the pumped storage power plant resides in supplying energy in a flexible manner in accordance with the demand. The object of the present invention is based on a similar concept.

In the case of a dam having established at a distance, or fall, of 100 m from a power station, for example, the density of the energy stored by the water inside the dam is $10^6$ Joule per 1 m$^3$ of water. If the fall were to be extended, the accumulated energy density would be increased in proportion to the fall.

A capacitor is also a physical means of storing energy, in which the energy is stored in the form of a static energy. This means is characterized by that it allows drawing of high energy at one time. For example, in an extreme case, all the stored energy can be drawn out at a period as short as $10^{-9}$ seconds. However, in this case again, the density of the accumulated energy in general is not large.

In a capacitor, the energy is assumed to be stored by an electric field generated between the electrodes. In general, a substance would not withstand a limitless high electric field because a dielectric breakdown occurs upon application of an electric field exceeding a certain limit. This limiting electric field is $10^8$ V/m for a commonly known substance. Since E in general is in the range of from $10^{-11}$ to $10^{-9}$, the maximum density of the stored energy in an ideal capacitor is $10^7$ J/m$^3$.

In addition to the means of storing energy taking advantage of a static electric field, there also is a means of storing energy using a static magnetic field, i.e., an energy storage device making use of a superconductive closed current. This method comprises forming a persistent current in a closed superconductive coil. In principle, the energy is stored in the form of a magnetic field having generated by the superconductive permanent current. The energy in a magnetic field is expressed by $\mu H^2 = B^2/\mu$, where, $\mu$ represents the permeability which is minimum in vacuum, i.e., $10^{-6}$; H represents the magnetic field; and B represents the magnetic flux density. The magnetic flux density, B, however, has an upper limit because under a magnetic flux density as high as 100 Tesla (T), the superconductor no longer maintains the superconductivity. In general, the superconductors can be used stably up to a flux density of 30 T. This signifies that the maximum achievable density of the accumulated energy is $10^9$ J/m$^3$ which is considerably high for a physical means of storing energy. However, in the light of the present technological status, the superconductor applicable for this purpose requires cooling with liquid helium. This requirement can be fulfilled only with the construction of a gigantic cooling facility, and, moreover, the huge magnetic field having generated at the storage of energy requires shielding which accounts for a large volumetric portion of the whole installation. Thus, the energy storage device using the superconductive closed current is not yet to be applied in a commercial level.

In contrast to the physical means of storing energy described above, an energy storage means using flywheels has drawn much attention because of its simplicity, use of compact apparatuses, and the high density of stored energy achievable therewith.

In an apparatus using flywheels, in principle, the energy is conserved as a rotational energy (a type of kinetic energy) of the flywheels. The rotational energy is expressed by $Iw^2/2$ where I represents the moment of inertia and w represents the angular velocity of the flywheel. If the flywheel is a disk having a radius of r and a thickness of D, and made of a material having a density of p, the moment of inertia I thereof can be given by $2\pi p D r^3/3$. Since the volume of a flywheel is expressed by $\pi r^2 D$ the density of the accumulated energy becomes $prw^2/3$. Considering that commonly used substances have a density of about $10^4$ Kg/m$^3$, e.g., $10^3$ Kg/cm$^3$ for water and $2\times 10^4$ Kg/m$^3$ in substances having maximum densities, it is more advantageous to increase other parameters than to seek materials having higher densities. From the equation above which represents the density of the accumulated energy, the density of the accumulated energy increases with increasing speed of rotation. When a flywheel having a radius of 1 m, which is made of a material whose density is $10^4$ Kg/m$^3$, is rotated at a rate of $10^5$ rpm (which is nearly equal to $10^3$ rad/s), for example, the density of the accumulated energy can be obtained as $3\times 10^9$ J/m$^3$. This density of the accumulated energy is extraordinarily large as compared with any other physical means of energy storage. If the rotational speed were to be increased by an order of magnitude, a density of the accumulated energy exceeding the upper limit of the stored energy density by a chemical means might be achieved. More advantageously, this means allows large energy discharge at one time, which can be never realized with a chemical means of storing energy.

It is also necessary to make environmental considerations in discussing the present day means for energy storage. Men have consumed fossil fuels such as coal and oil without taking particular notice of the environmental problems. The fossil fuels are advantageous in that they have considerably high density in the accumulated energy and that they allow simple handling. Thus, they are substantially free of problems in general use, and are widely used in many traffic and transportation means. In contrast to the fossil fuels having this advantage in handling, the fuels used in electric automobiles, hydrogen-fueled cars, and the like suffer inconvenience in handling and in the density of the accumulated energy. Thus, at the present, those cars are far from being commercial products.

However, as can be seen from the problem of global warming, the worldwide movement is headed to such which refrains from using fossil fuels, because the consumption of a fossil fuel signifies increasing emission of carbon dioxide into the atmosphere.

Furthermore, despite the importance as a basic material to support the present day industries, fossil fuels are subject to international affairs. This problem was made obvious in the recent Persian Gulf Crisis.

As an alternative energy source to replace fossil fuels, there can be mentioned nuclear power and solar photovoltaic cell power generation. However, the use of a nuclear power is disadvantageous in that there are difficulties in establishing and controlling nuclear power plants; moreover, it cannot be made so compact as to mount it on a car. Thus, nuclear power plants should be constructed at remote areas far from habitation, and the consumers use the electric power transmitted over a long distance. Furthermore, cars must store the electric energy in some manner and mount the stored energy inside the car to move freely. In the case of using solar photovoltaic energy, there is a drawback that energy cannot be supplied during night time and on cloudy days. This method therefore inevitably requires the energy to be stored.

At present, a study of converting the energy obtained by other means into artificial fuels (such as synthetic petroleum) is made. However, the production cost thereof is so expensive that is far from being practical.

As mentioned in the foregoing, it is strongly desired to store the energy having produced by nuclear power and solar photovoltaic cells in a form which allows men to use in convenience.

With respect to the conventional means of storing energy by the use of a flywheel, there have been problems concerning the structure. In the conventional flywheels, a bearing is incorporated to support the flywheel. The rotational speed of a flywheel is limited by this structure, and, in practice, a flywheel 1 m in diameter could not afford a rotational speed of $10^5$ r.p.m with a prior art technology.

SUMMARY OF THE INVENTION

An object of the present invention is to provide a means of storing energy at an improved density using a flywheel type energy storage device, by increasing the rotational speed of the flywheel to a speed far exceeding the limit mentioned above.

The present invention provides an energy storage device which comprises a flywheel being supported by the interaction between a superconductor and a magnetic field, and not by the conventional mechanical means such as bearings.

DETAILED DESCRIPTION OF THE INVENTION

The interaction between a superconductor and a magnetic field is briefly explained. In a typical interaction between a superconductor and a magnetic field, a repulsive force is exerted to the superconductor by the magnetic field in such a manner that the superconductor is levitated over a magnet, and vice versa. This effect has been well known as the Meissner effect.

However, the recent progress in the study of superconductivity newly revealed another interaction in addition to the Meissner effect. According to the Meissner effect, the interaction between the magnet and the superconductor is extremely unstable because it is established by a repulsive force. However, a complicated effect is shown in the newly found interaction. That is, when the distance between the magnet and the superconductor is too short, a repulsion between the two bodies occurs, but when the two are taken apart for over a certain distance, then an attraction generates between them. This effect awaits full elucidation in principle, but a tentative explanation is given. It is believed that a potential minimum is present midway between the magnet and the superconductor, and that the relation between the magnet and the superconductor stabilizes at this point. Thus, the interaction becomes very stable and therefore suitable for supporting objects. This newly found interaction is prominent in the recently found ceramic superconductors, and, particularly so in the oxide ceramic superconductors containing a lanthanide or yttrium, barium, copper, and oxygen (Ln—Ba—Cu—O superconductors); in those containing bismuth, strontium, calcium, copper, and oxygen (Bi—Sr—Ca—Cu—O superconductors); and in those containing thallium, barium, calcium, copper, and oxygen (Tl—Ba—Ca—Cu—O superconductors).

Figure 1:
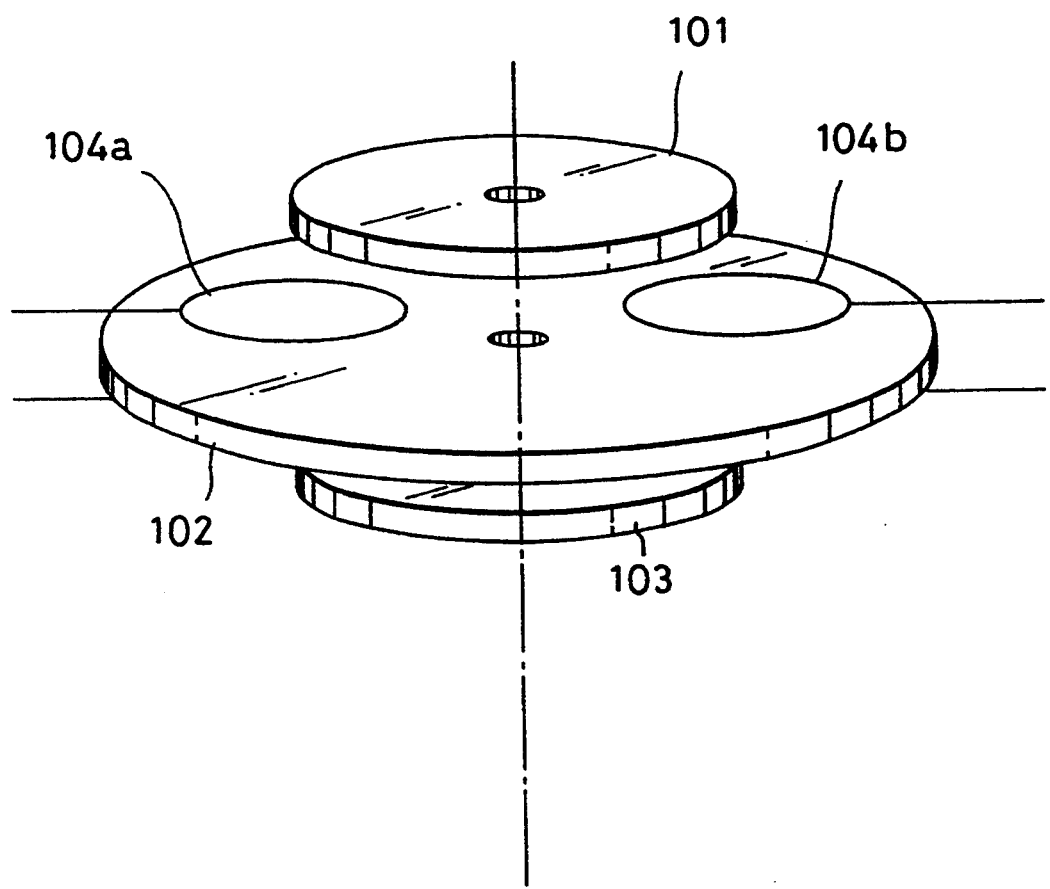
FIG. 1 shows a schematic view of an energy storage device according to an embodiment of the present invention.
Figure 3:
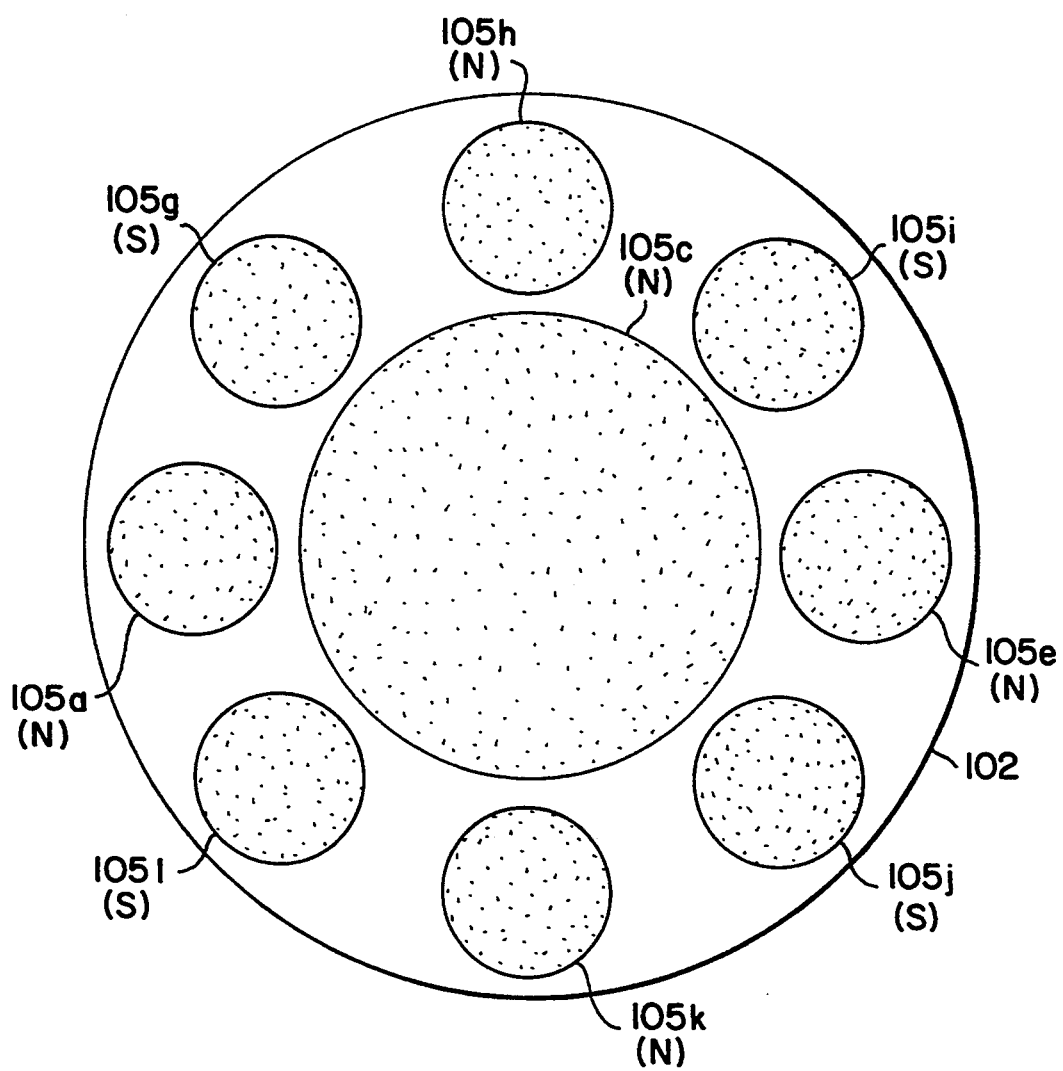
FIG. 3 shows a schematic view of a flywheel according to an embodiment of the present invention.

Referring now to FIG. 1, the technological concept of the present invention is described below. As is shown in FIG. 1, magnets are formed on the surface of a flywheel 102, in such an arrangement as shown in FIG. 3. That is, a magnet showing its north pole (N pole) in the center is surrounded by the magnets showing the N-poles and south poles (S-poles) in turn. The superconductors 101 and 103 levitate the flywheel by the interaction of those superconductors and the magnets arranged on the surface of the flywheel. The coils 104a and 104b exert rotational force to the flywheel and convert the rotational force to electric energy.

Figure 2:
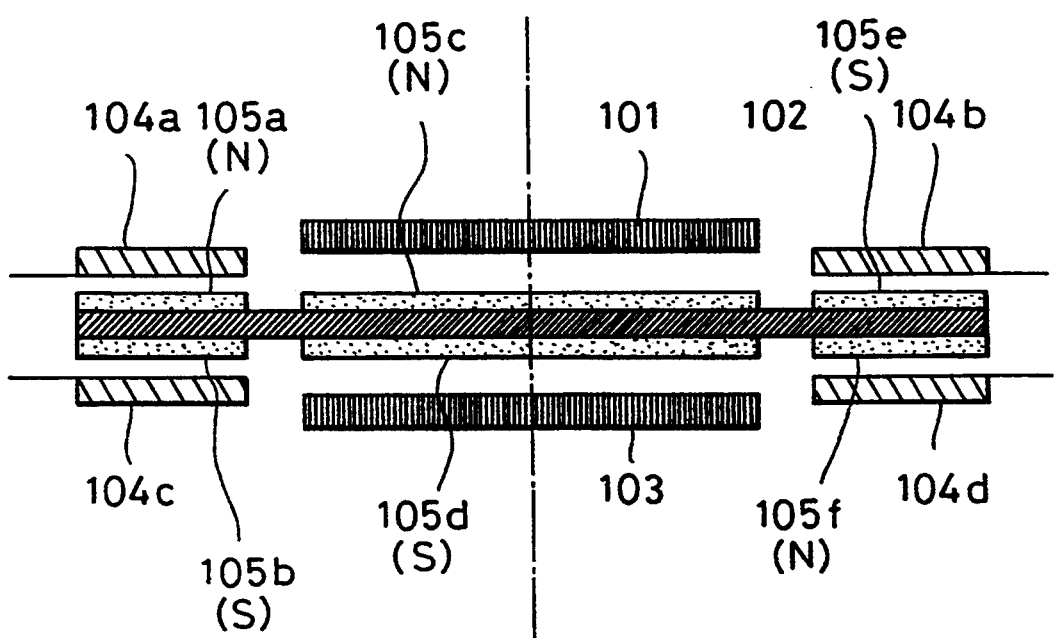
FIG. 2 shows a schematic side view of the energy storage device according to an embodiment of the present invention, which is shown in FIG. 1.

In FIG. 2 is shown the side view of the device shown in FIG. 1. The magnets can be shown on the surface of the flywheel. In the device shown in FIGS. 1 and 2, the superconductors are present both near the surface and the back of the flywheel, but the magnets on either side may be omitted so the magnets may be arranged on only one side of the flywheel. However, the stability was superior for the device having the magnets on both sides of the flywheel.

Further referring to the device shown in FIGS. 1 and 2, the, coils 104a through 104b are provided separately. In a modified embodiment, however, all the coils may be connected to a single electric system. In such a modified construction, the coils function collectively as a device which supplies the rotational force to the wheel, and also as a device for converting the rotational force of the wheel to an electric energy. This can be readily understood by analogy of an electric motor which functions as a power generator.

It is also possible, for example, to use the coils 104a and 104b as a device for providing rotational force to the wheel, and the coils 104c and 104d as a device for converting the rotational force into electric energy. Furthermore, it should be noted that a larger number of coils can be provided to an actual device, despite only two pairs each, four in total, of the magnets are drawn in the device shown in FIGS. 1 and 2. However, care must be taken to arrange the coils in a higher symmetry to stabilize the rotation of the flywheel. By thus designing the device, a high speed of 100,000 r.p.m. or higher was achieved in the device according to the present invention.

Furthermore, though not shown in the FIGURE, the use of a soft iron and a ferrite for the magnetic core of the coil further increased the maximum value of the output current. The output electric energy which results from the rotational energy can be controlled by controlling the distance between the coil and the flywheel. For example, if the coil is placed at the very vicinity of the flywheel and if it is fixed at that position, a large amount of electric energy would be generated at the initial stage, i.e., when the flywheel is at its full speed, but the electric energy would be lowered once the flywheel begin to lose its energy by the commencement of power generation and hence it would begin to rotate at a lower speed. This mode of power generation is effective when a large amount of electric energy is required at a short period of time, however, it is quite unfavorable in case a stationary consumption of electric energy is considered.

Thus, it is possible to obtain a constant electric energy by varying the distance between the flywheel and the coil. First, the coil is placed distant from the flywheel rotating at a high speed, and, the coil is then gradually placed closer to the flywheel with decreasing rotational speed of the wheel.

The method of storing energy according to the present invention is described in further detail below referring to FIGS. 1 through 3. First, the flywheel 102 at rest is levitated by the interaction between the superconductors 103 and 101 and the magnets 105c and 105d established on the surface of the flywheel.

Then, an electric energy is externally supplied to the device. If a direct current (DC) is supplied, for example, the DC must be first converted into an alternated current (AC) having a pertinent frequency to exert a rotational force to the flywheel. This can be done by using a DC-AC converter which is not shown in the FIGURE. There are also cases in which the frequency of the AC is not appropriate for a favorable rotation. In such cases again, a frequency conversion is carried out to initiate the rotation. Since the flywheel is at its rest at the initial stage, the converted AC frequency is as low as nearly zero.

The low frequency current is then introduced to the coils 104a through 104d to generate a magnetic field. At this point, the flywheel begins its rotation by the interaction between the coils and the magnets, e.g., 105a, 105b, 105e, and 105f, which are provided on the surface of the flywheel. This effect in principle is the same as that of the known electric motors. The flywheel then increases the rotational speed with increasing supply of electric energy. The frequency of the AC to be supplied to the device should be synchronized With the rotation of the flywheel. Otherwise, the rotational motion of the flywheel would be obstructed.

When the external supply of electric energy is minimized to nil or to a substantially low level, the electric circuit of the coil is turned off. At this point, the external supply of electric energy is cut and the coil no longer generates a magnetic field, but the flywheel continues its rotation by inertia to maintain the energy. In a conventional flywheel which is supported with a bearing, the rotational energy of the flywheel decreases with time to give a duration of energy retention of a mere 10 minutes at best because of the resistance ascribed to the presence of air and of the frictional resistance which occurs between the bearing. However, since no bearing is used in the flywheel according to the present invention, the duration of retaining the rotational energy is far longer than that of a conventional flywheel. In the case of a flywheel placed in a vacuum vessel, it kept rotating for over 1 hour, since no resistance was exerted by air.

The device according to the present invention is characterized by that the flywheel can be placed in vacuum. If a conventional flywheel supported by a bearing were to be placed in vacuum, the whole device should have been placed in a vacuum vessel. Moreover, not a small man power was necessary for the maintenance, inspection, and adjustment of the mechanical parts such as the bearings placed in a vacuum vessel. Still more, even in such vacuum, since the resistance of the bearing was far larger than the that of the air, the advantage of using the vacuum was almost lost.

In another embodiment according to the present invention, the flywheel alone may be placed in vacuum. This can be easily realized because the mechanical parts other than the flywheel need not be established in vacuum. This is advantageous in that a more compact vacuum vessel can be used, and in that a sealed vacuum container in the form of, e.g., a vacuum tube, can suffice the purpose.

Another advantageous point of the device according to the present invention is that it comprises less mechanical parts as compared with the conventional flywheel devices. For example, the device according to the present invention does not suffer the wear of bearings and other such problems. Thus, the whole device can be placed into a vacuum vessel and used free of maintenance for a long time.

In taking out energy from the rotating body, the electric circuit of the coils 104a through 104d is turned on at first to generate an electromotive force in the coils by the electromagnetic induction reaction between the magnets on the flywheel and the coils. When the positional relation between the flywheel and the coils is fixed, the electric energy is at its maximum at first and then diminishes with decreasing rotational speed. The electric energy is generated as an AC having a frequency in proportion to the rotational speed of the flywheel. Accordingly, the high frequency at the initial stage is gradually lowered. Since it is not favorable to have fluctuation in the frequency from the viewpoint of supplying energy, a DC-AC converter mentioned hereinbefore or a device equivalent thereto is incorporated to obtain a DC or an AC having a specific frequency.

It is also not favorable from the viewpoint of supplying energy that the electric energy fluctuates with time. To assure a stable supply of energy, the position of the coil may be altered to maintain a constant energy output, as described above.

In the foregoing, a device in which the electric energy is supplied and taken out using the same coils was described. In addition to the described type of device, a device which comprises a supply coil and an output coil is also feasible. For example, the coils 104a and 104b may be used for externally supplying electric energy, and the coils 104c and 104d may be used for the energy output. It is possible to improve the operability of the device in such an embodiment, because an electric circuit for energy supply can be established and used separately from an electric circuit for taking out energy.

In the foregoing descriptions, the flywheel was initially maintained at rest. However, the electric energy may be supplied, retained, and taken out on the flywheel which is kept rotating at a constant rotational speed or higher.

The present invention is described in further detail below referring to non-limiting examples.

EXAMPLE 1

Figure 4:
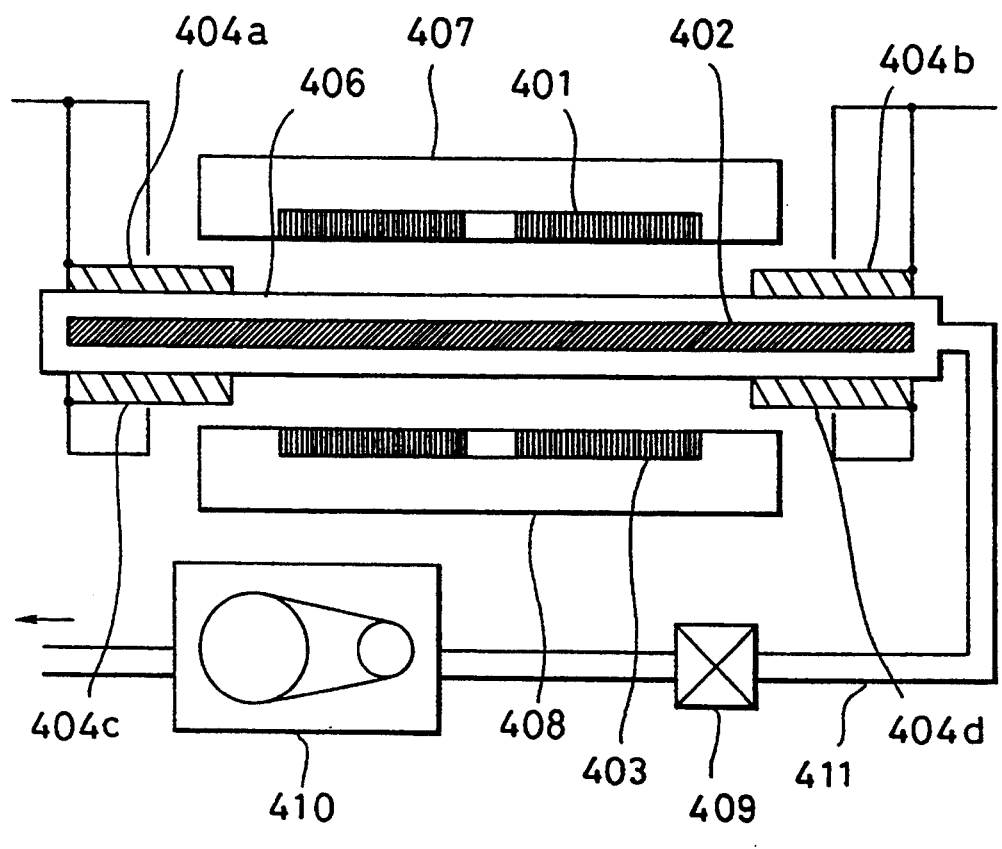
FIG. 4 shows a schematic side view of another energy storage device according to an embodiment of the present invention.

Referring to FIG. 4, an embodiment of the device according to the present invention is described below. The figure is a schematic drawing and the details are omitted.

The device according to the present invention comprises a flywheel 402 having incorporated between superconductors 401 and 403. Though the superconductor in the figure is drawn as a monolithic body, the superconductor referred herein not necessarily signify the superconductor itself, but is inclusive of structures which use a superconductor and which are subject to interaction with the superconductor and a magnetic field. Accordingly, the term simply referred to as "superconductor" includes those structures comprising a superconductor having provided on the surface thereof a coating of either an inorganic or an organic material, or those composed of a plurality of superconductors in combination, and those may comprise non-superconductors filling the interstices of the superconductors.

Though not shown in FIG. 4, permanent magnets as shown in FIG. 3 are established on the surface of the flywheel 402. The flywheel is thus levitated between the upper and the lower superconductors by the interaction between the magnets and those superconductors. The flywheel is enclosed in a vacuum vessel 406 which is evacuated with a vacuum pump 410 through an evacuation pipe 411 and a valve 409. The pressure at the operation is preferably maintained as low as possible to reduce the resistance ascribed to the presence of air. Needless to say, the rotation of the flywheel is maintained far longer in the present device as compared with the case in which a conventional device comprising a flywheel being supported by a bearing is used, or with the case operating the device of the present invention in the atmosphere. It is preferred that the vacuum vessel is maintained at a pressure of 10 Torr or lower to assure stable rotation; when the pressure is decreased to $10^{-2}$ Torr or lower, a high stability in rotation can be obtained free of influences ascribed to unexpected vibrations applied from the outside. Since a high vacuum can be obtained only by the use of special use pumps, the degree of vacuum must be selected upon consideration of the purpose and the price of the device. More specifically, a sufficient degree of vacuum can be achieved by the use of a common hydraulic pump, optionally with an oil getter such as a liquid nitrogen trap. It is preferred that the device is equipped with an oil getter, because the oil which dissipates from the vacuum pump deposits on the inner wall of the vacuum vessel to impair the rotational movement of the flywheel. Otherwise, the vacuum vessel may be sealed like a vacuum tube so that it may be completely cut off from a vacuum evacuation apparatus.

As is shown in FIG. 4, the superconductors 401 and 403 have no superconductors at the vicinity of the rotating axis. Such a structure considerably improves the stability of the flywheel along the horizontal direction.

Coils 404a through 404d are arranged at the periphery of the flywheel to externally supply the electric energy and to convert the rotational energy of the flywheel into an electric energy. The coil may have a hollow core structure, but preferably, a thin silicon steel sheet or a ferrite (a magnetic oxide) is used as the core to conduct the energy conversion at a high efficiency. In this case, the coils 404a and 404c are used for supplying the electric energy, whereas the coils 404b and 404d are used for the energy output. This particular structure using the upper and the lower coils as a pair is taken to further increase stability of the flywheel by balancing the interaction between the upper and lower coils and the magnet.

The superconductors 401 and 403 are each cooled by the cooling apparatuses 407 and 408 which both are filled with liquid helium.

The superconductor used in the present embodiment was an oxide superconductor containing yttrium, barium, copper, and oxygen, which was prepared in the following process.

Yttrium oxide ($Y_2O_3$), barium carbonate ($BaCO_3$), and copper oxide ($CuO$) each 99.9% pure and in powder forms were accurately weighed out to obtain a mixture containing Y, Ba, and Cu at a molar ratio of Y:Ba:Cu=1:2:3, and the resulting powder mixture was mixed using a ball mill for a duration of 1 hour. The resulting mixture was fired in air at 900° C. for 49 hours. The product was confirmed by X-ray diffraction to be composed mainly of an $YBa_2Cu_3O_{7-x}$ ($0<x<1$) oxide superconductor, and then crushed again using a ball mill. 100 g of the thus pulverized product was charged in an alumina crucible, and was fused by heating at 1400° C. for an hour. The fused product was cast in a cooled copper disk mold to quench. Copper is preferred for the disk mold to alumina or to iron. An iron mold was too reactive to the fused product, and only superconductors having poor properties resulted therefrom. Moreover, the thermal conductivity is lower for an iron mold as compared with that of the copper mold. An alumina mold has a thermal conductivity well comparable to that of the copper mold, but the fused product frequently adhered to the alumina mold too tightly that cracks generated on the solidified superconductors in such cases. In contrast to the alumina and iron molds, the copper mold has a favorable thermal conductivity, and the solidified superconductor could be easily removed from the mold because an easily releasable copper oxide formed at the boundary between the fused product and the mold. Because this easily releasable copper oxide layer avoided stress concentration, the generation of cracks could be minimized. Moreover, the solidified product could be readily released from the mold also. A platinum mold was also used for trial to produce a superconductor in success. The resulting superconductor had a favorable superconductive properties. This is because platinum diffuses into the superconductor to improve the superconductive characteristics.

A similar effect could be observed in producing a superconductive material as above, except for adding a trace amount (up to several percentage) of silver and the like to the material at the firing step.

The fused and solidified product thus obtained was sintered in a mixed gas of oxygen and argon (containing 5% of oxygen) under the atmospheric pressure, at a temperature of 1000° C. for a duration of 12 hours. The sintering thus obtained was cooled as it is from 1000° C. to 900° C. over 60 hours, and was annealed finally at 400° C. for 48 hours in oxygen.

The product thus obtained was a polycrystalline oxide superconductor expressed by $YBa_2Cu_3O_{7-x}$ ($0<x<0.1$), having a superconductive transition point of 92.5K as determined by measuring the superconductive diamagnetism. The preparation method described above is only an example, and the superconductors may be prepared by various other methods.

The flywheel type energy storage device having the construction as described above comprises a flywheel 0.1 m in diameter and 0.05 m in thickness. This flywheel had a momentum of inertia of 2.5 kg·m, and could be rotated at a speed of $10^4$ r.p.m., with decrease in the rotational speed within 1% even after rotating for 1 hour. The energy accumulated in the flywheel at this state is estimated as $1.25 \times 10^6 J = 347$ Wh.

EXAMPLE 2

Figure 5:
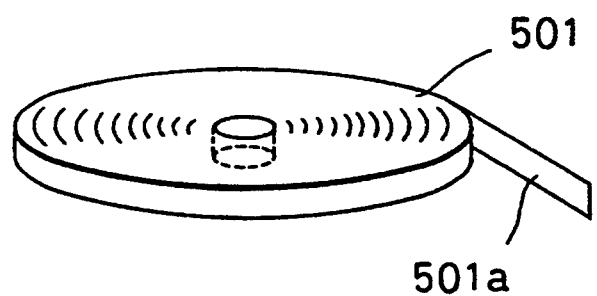
FIG. 5 shows a schematic view of a superconductor according to an embodiment of the present invention.

A device having the structure as shown in FIG. 4 was used, except for replacing the superconductors with the superconductors shown in FIG. 5. The superconductor used in this embodiment is a multilayered coil obtained by coiling a narrow tape of a superconductor wire material. In the FIGURE, the flywheel is supported by a superconductor 501 which is composed of superconductor wire material 501a. The flywheel could be operated in the same manner as in the foregoing Example.

The superconductor wire material which constitutes the superconductor comprises an $YBa_2Cu_3O_{7-x}$ ($0<x<1$) oxide superconductor having inserted into a thin tube of silver (99.999% or higher in purity). The cross section of the tube showed that it had a tape-like structure 0.5 mm × 20 mm in dimension. A similar effect was obtained with a wire material having a circular cross section 5 mm in diameter. Furthermore, an effect comparable to the case above was obtained when an oxide superconductor containing bismuth, strontium, calcium, copper, and oxygen was used as the superconductive material.

These superconductor wires were each wound into multilayered coils. Among the resulting coils, the one using the $YBa_2Cu_3O_{7-x}$ oxide superconductor was sintered at 950° C. for 12 hours in oxygen, followed by annealing at 400° C. for 24 hours. The one using the oxide superconductor containing bismuth, strontium, copper, and oxygen was sintered at 800° C. in argon gas atmosphere containing oxygen at a concentration of 1% or lower.

EXAMPLE 3

Figure 6:
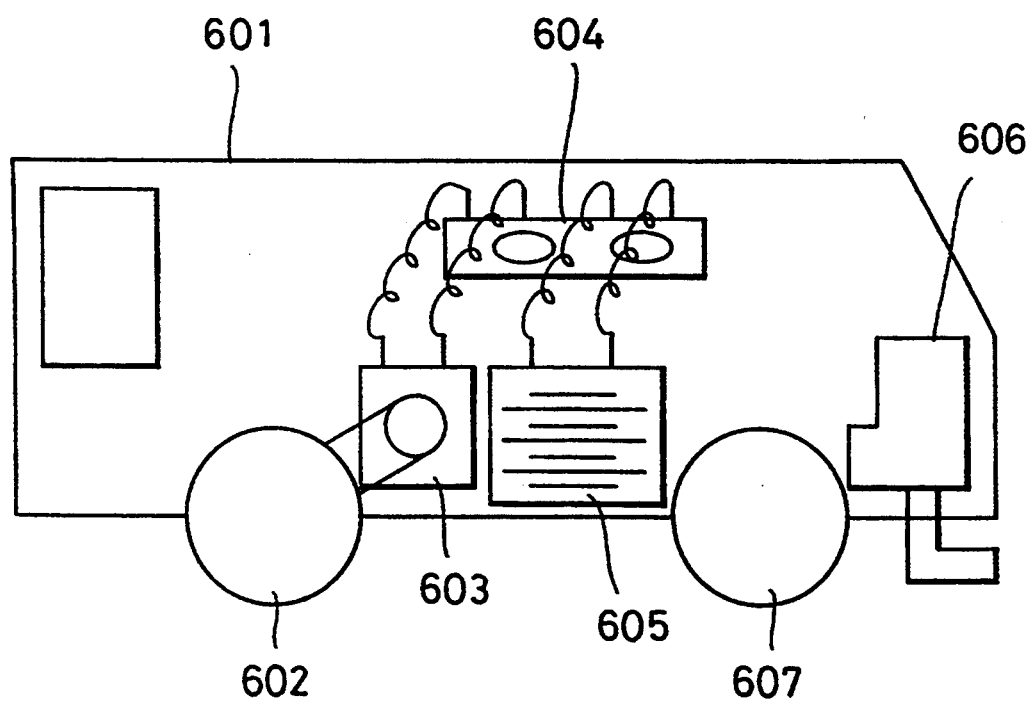
FIG. 6 shows a schematic view of an energy storage device according to an embodiment of the present invention being utilized in a practical application.

Referring to FIG. 6, an embodiment using the device according to the present invention in a practical application is described. In FIG. 6 is shown a schematic view of an electric energy storage device having mounted on a transportation means such as an automobile.

Let us consider a case of stopping an automobile 601 in motion. The rotational energy of front wheels 602 is transmitted to a dynamo 603, which is then converted into a DC electric energy and transmitted to a DC-AC converter 604. The electric energy converted by the DC-AC converter 604 is transmitted to an energy storage device 605 as an AC having a frequency synchronized with the rotational speed of the flywheel of the energy storage device 605, so that it may be stored as a rotational energy in the flywheel. By this process, the kinetic energy of the automobile is converted first to an electric energy, and then to rotational energy to be stored in the flywheel. The automobile is decelerated by this effect.

When the automobile becomes sufficiently decelerated, the supply of the electric energy to the energy storage device 605 is cut off so that the automobile may be stopped by operating the brake in the usual manner. At this point, the energy is stored in the energy storage device 605 as a rotational energy of the flywheel.

Then, on the start of the automobile, the energy accumulated in the flywheel is used in addition to the power exerted by the inner combustion engine 606 which is normally mounted on the automobile. More specifically, the electric energy drawn out of the flywheel as an AC is converted into a DC using the DC-AC converter 604, which is then supplied to the dynamo (which functions in the same manner as an electric motor) to drive the front wheels 602. At the same time, the rear wheels 607 are driven by the inner combustion engine 606.

In general, a safer braking can be effected by making the braking of the front wheels stronger than that of the rear wheels. Accordingly, in this example, the braking is carried out by storing the kinetic energy of the front wheels as the rotational energy of the flywheel.

The most energy consuming step in the motion of an automobile is the start-up. In the present example, both the power supplied from the inner combustion engine and the electric power supplied from the flywheel are used at the start-up. It can be seen that the electric energy supplied from the flywheel is effectively utilized, since this electric energy originally is the kinetic energy of the automobile accumulated at the braking. Furthermore, since the load to the inner combustion engine can be lowered at the start-up, the inner combustion engine can be reduced in capacity. This structure for a rolling stock is considerably effective in realizing low fuel cost and reducing the exhaust gas, particularly in driving the rolling stock on a flat road.

The energy necessary for accelerating an automobile weighing 10 tons up to a hourly velocity of 50 km/h is $10^6$ Joule. This amount of energy can be sufficiently supplied by a single energy storage device described in Example 1. The weight of the device described in Example 1 is 30 kg or less, which is a weight accounting for less than 1% of the total weight of the automobile. Even though a plurality of those devices were to be mounted, the increase in the total weight of the automobile is negligible. In contrast, the acceleration of the automobile can be improved.

When an automobile having a weight of 10 tons climbs a slope having a difference in altitude of 100 m, an energy of $10^7$ Joules is required. In this case, a single device of Example 1 cannot suffice the requirement. However, the accumulated energy can be increased by 16 times by increasing the rotational speed of the flywheel by four times. Otherwise, the number of the flywheels may be increased as well.

EXAMPLE 4

Figure 7:
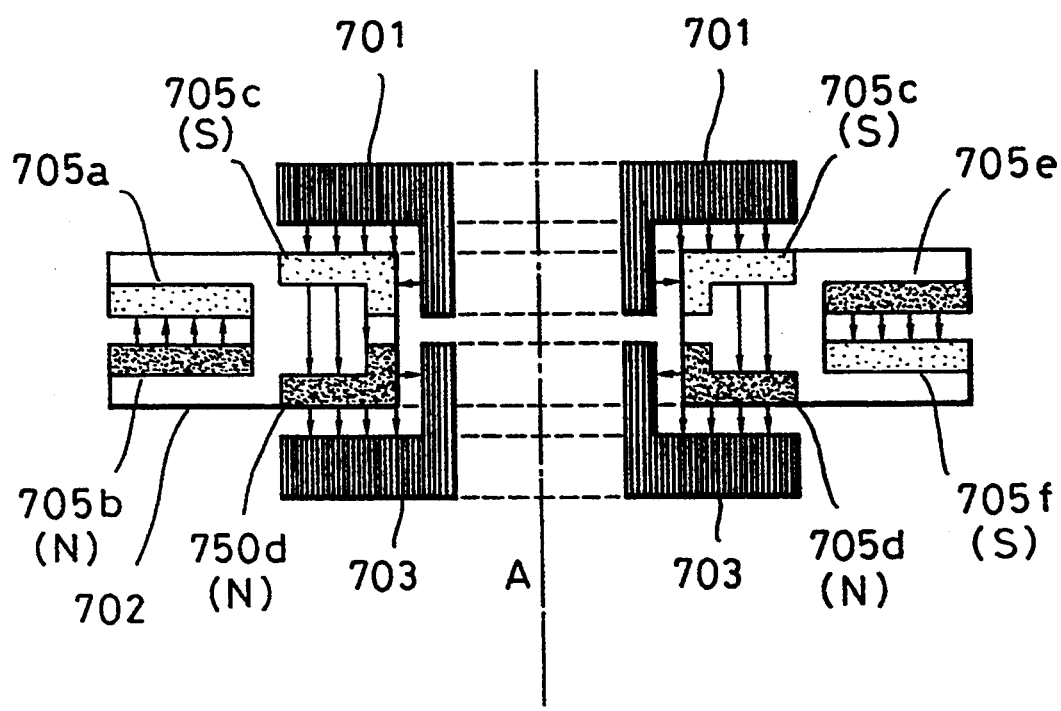
FIG. 7 shows a schematic view of a member of an energy storage device according to an embodiment of the present invention.

Other types of flywheels and superconductors for supporting them are described. In FIG. 7 is shown a schematic view of a flywheel according to an embodiment of the energy storage device of the present invention and superconductors supporting the same.

Superconductors 701 and 703 are provided over and under a flywheel 702, similarly to the device described in Example 1. In this Example, however, the vicinity of the rotating axis is made hollow A. Thus, the hollow portion A may be used for other purposes in this embodiment. The moment of inertia of a flywheel is more influenced by the mass of the peripheral portion than that of the central portion. Accordingly, by providing a hollow portion at the center of the flywheel, a larger density of accumulated energy per unit volume can be expected.

The structure comprising a hollow portion at the center takes full advantage of the characteristics of the present invention. If a hollow portion were to be provided at the center of a conventional flywheel using a mechanical bearing, the bearing should be naturally arranged farther from hollow portion at the center, thereby increasing the contact area between the bearing and the flywheel. This signifies increase in resistance at the rotation of the flywheel. Thus, it is quite natural that a hollow portion as shown in FIG. 7 was not provided at the center of a conventional flywheel for energy storage, and, an idea of making such a structure were far from being practical.

In the present Example, the superconductors 701 and 703 are L-shaped to stabilize the rotation of the flywheel. That is, in a structure having a hollow portion around the rotating axis as shown in FIG. 7, the position of the rotating axis becomes mal-defined, and tend to cause an unstable rotation. The L-shaped structures were indispensable to preform a stable rotation.

In the device shown in FIG. 7, a groove was further provided to the outer periphery of the flywheel, and magnets 705e and 705f were arranged facing over said groove, the magnets 705a and 705b having the reverse polarity to those of 705e and 705f. The arrows in the FIGURE indicate the magnetic field having generated by these magnets. Differing to the case of Example 1, the coil for supplying external electric power and the coil for converting the rotational energy into an electric power are inserted between the magnets. More specifically, the coils are inserted between the magnet 705a and the magnet 705b, and between the magnet 705e and the magnet 705f. As was pointed in the case of Example 1, in this Example again, the electric energy at its maximum at the initial stage diminishes with decreasing rotational speed, if the positional relation between the flywheel and the coils were to be fixed. To avoid fluctuation in the supply of electric energy the position of the coil must be varied with changing rotational speed of the flywheel.

In the structure shown in FIG. 7, the coil is inserted between the magnets 705a and 705b, and between the magnets 705e and 705f. However, the object mentioned above can be achieved by moving the position of the coil to the left or to the right, to thereby vary the number of magnetic flux which penetrate the coil.

Furthermore, the flywheel shown in FIG. 7 can be sealed in a vacuum container, but the details are not described herein. Otherwise, the flywheel of the present Example can be used in the device described in Example 1, and using the method explained in the same Example.

EXAMPLE 5

Figure 8:
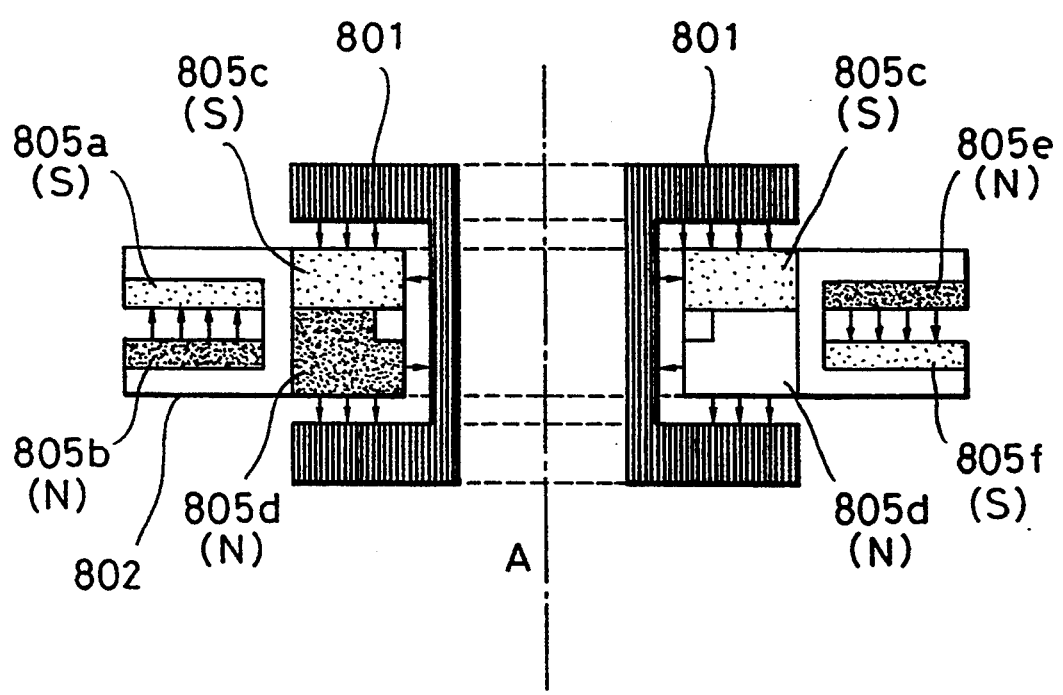
FIG. 8 shows a schematic view of a member of another energy storage device according to an embodiment of the present invention.

In FIG. 8 is shown a flywheel according to another embodiment of the invention and the superconductors for supporting the same. The structure is similar to that shown in FIG. 7, but different therefrom in the point that the two superconductors provided over and under the flywheel are replaced by an superconductor integrated in a monolithic body.

EXAMPLE 6

Figure 9:
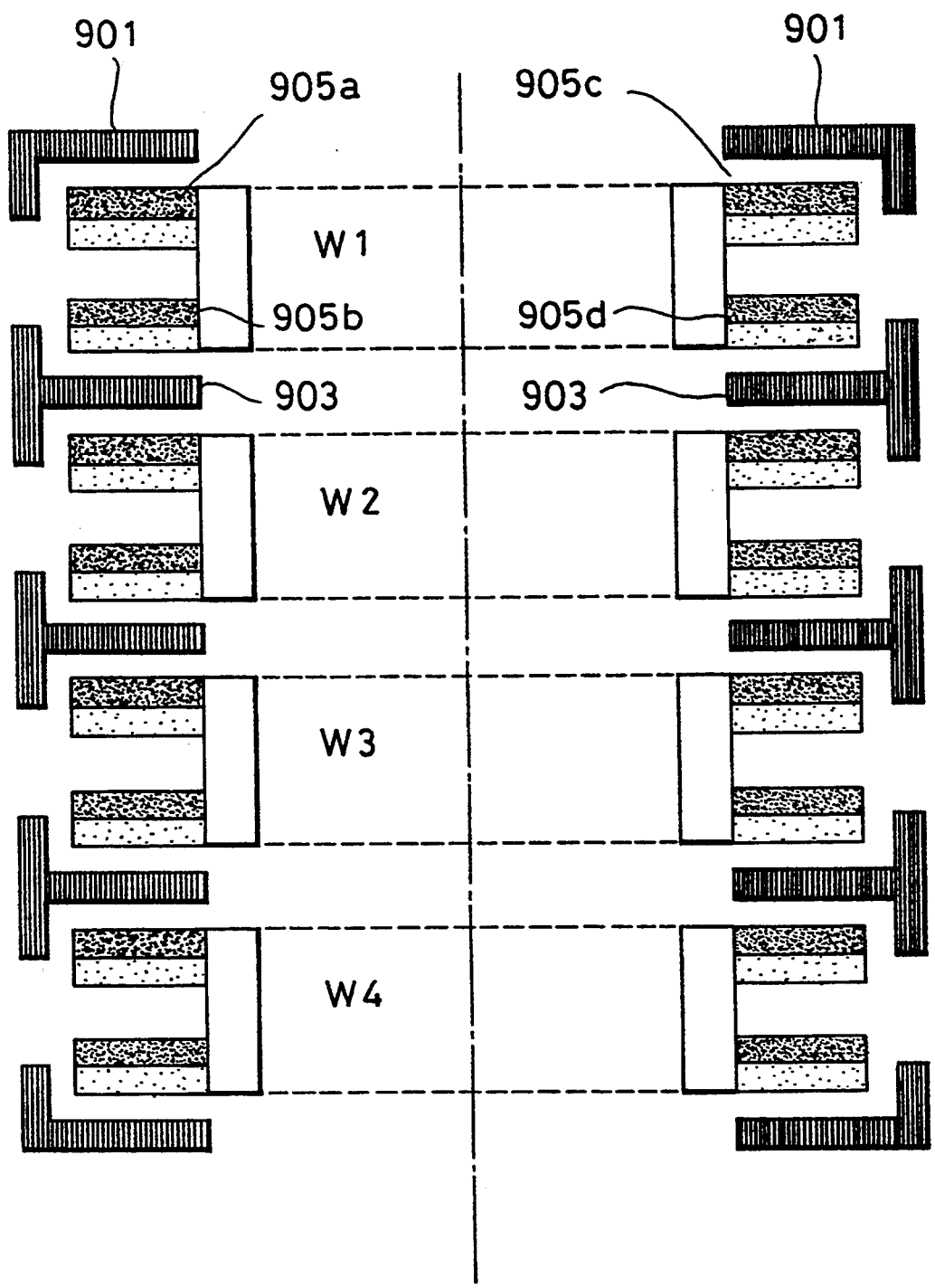
FIG. 9 shows a schematic view of a member of another energy storage device according to an embodiment of the present invention.

FIG. 9 shows an energy storage device having a layered structure composed of a plurality of flywheels. Not only the structure is multilayered, but also there are some points differing from the structures described in the EXAMPLES 1 through 6.

One differing point is that the superconductors supporting the flywheel are provided at the outside of the flywheel. Since the structure is multilayered, the superconductor 903 which is incorporated between a first flywheel W1 and a second flywheel W2 functions as a support for both the W1 and the W2. Thus, by making a multilayered structure, not only the capacity of energy storage can be increased, but also can economize in superconductors as compared to a mere combination of multiple energy storage devices. As a result, the amount of stored energy per weight of the device can be increased.

The other differing point is that the magnet which functions as a support for levitating the flywheel through the interaction with the superconductor is also used as a magnet established on the surface of the flywheel both at the supply of electric energy to the flywheel and at the take out of electric energy from the flywheel. Referring to FIG. 9, this is described in further detail. In FIG. 9, the upper surface of the magnet 905a shows an N-pole, and interacts with the superconductor 901 to support the flywheel. Naturally, the bottom surface of this magnet shows an S-pole, and is used for the supply and take out of the electric energy. In the magnet 905b, the upper plane showing an N-pole functions at the supply and take out of the electric energy, whereas the S-pole of the bottom plane interacts with the superconductor 901 to support the flywheel. The coil for use in the supply and drawing out of the electric energy is inserted between the magnets 905a and 905b, and between the magnets 905c and 905d, in a similar manner as described in Example 5.

The central portion at the vicinity of the rotating axis is made hollow, which is similar to the device described in Example 5.

EXAMPLE 7

Figure 10:
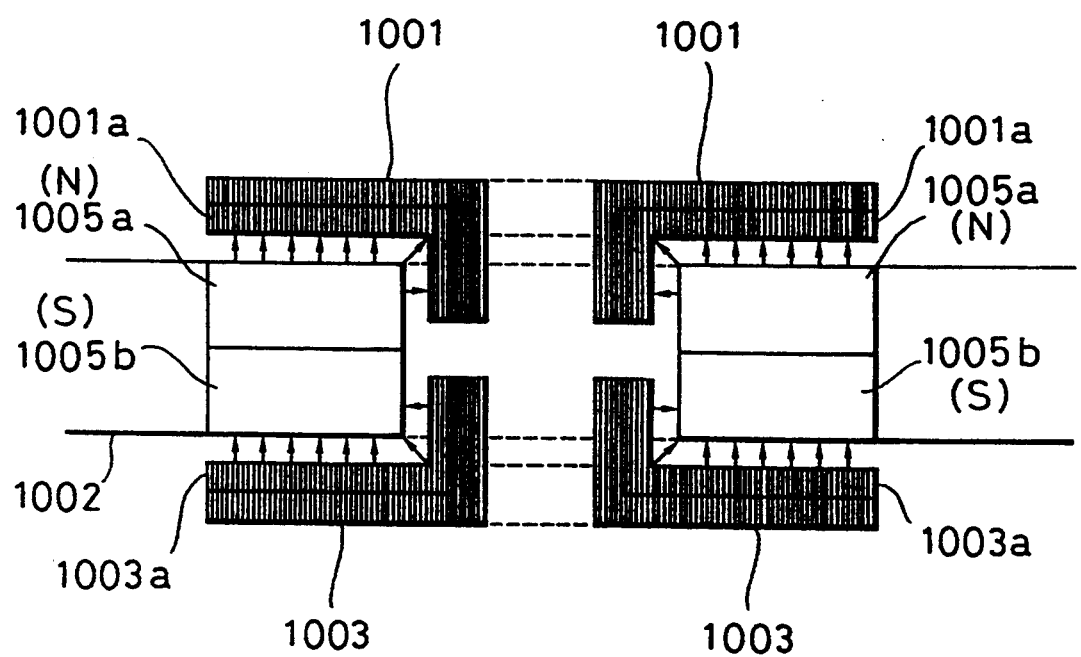
FIG. 10 shows a schematic view of a member of another energy storage device according to an embodiment of the present invention.

FIG. 10 shows a part of a flywheel according to an embodiment of the present invention and superconductors to support the same. The flywheel and the superconductors shown in the FIGURE have essentially the same structures as those described in Examples 4 and 5, except that a soft magnetic material, e.g., pure iron, soft iron, and various types of ferrites, is provided to the surface of the superconductor, at least to a part of the surface facing the magnet having provided to the flywheel.

In FIG. 10, a flywheel 1002 is sandwiched between superconductors 1001 and 1003. The surface of the superconductors are provided coatings 1001a and 1003a, which are made of a soft magnetic material such as a soft iron and ferrites. Suitable ferrites include a manganese-zinc ferrite, a nickel-zinc ferrite, a nickel-copper-zinc ferrite, a magnesium-copper-zinc ferrite, and a manganese-magnesium-zinc ferrite. The magnetic fluxes which enter and outgo the magnets 1005a and 1005b are indicated with arrows in the FIGURE.

By thus covering the surface of an superconductor with a soft magnetic material, it has been made clear that the interaction between the superconductor and the magnet can be further strengthened. In particular, it has been found that the attraction force therebetween can be increased in separating the magnet from the superconductor. Thus, referring to the structure shown in FIG. 10, for example, the attraction force between the flywheel and the superconductor can be increased by covering the superconductor 1001 provided over the flywheel with a soft magnetic material. In the structure described in connection to FIG. 10, both of the superconductors 1001 and 1003 were coated with a soft magnetic material. However, the coating may be provided on either of them, preferably to 1001, to obtain a sufficient effect.

The present invention provides an energy storage device using a flywheel, in which a superconductor is used to support the flywheel and thereby increase the capacity of the same. Despite flywheel was first proposed as a compact device to store energy at a high density, mechanical devices incorporated to support the flywheel in conventional devices hindered the increase in rotational speed. However, since the flywheel in the construction according to the present invention is not supported by a mechanical means, no particular limit in the rotating speed is posed. Particularly, rotating the flywheel in vacuum is next to impossible unless the present invention is applied. Furthermore, by applying the present invention, a flywheel having a diameter as large as 1 m can be rotated in vacuum at a speed as high as $10^5$ r.p.m. This signifies that an energy can be accumulated at a considerably high energy. This extremely high energy density can be realized if one may consider a turbine of a turbo engine mounted on a commercially available automobile rotating at a comparable rotational speed, but said turbine being about several centimeters in diameter.

Furthermore, as described in the foregoing Examples, the superconductor for use in the present invention can be produced by a relatively simple method. By selecting the type of the superconductors, a coolant such as liquid nitrogen which can be handled comparatively easily can be made use of. Liquid nitrogen can be used for a long time provided that a sufficient heat insulation is made, and the production thereof is quite simple. In mounting the energy storage device according to the present invention on an automobile for example, a part, i.e., a mere 10 W, of the output from the inner combustion engine can be shared to produce liquid nitrogen.

A detailed description of the magnets to be used in the flywheel is not given herein, but these magnets may be known permanent magnets, or such which function as permanent magnets, having obtained by magnetizing superconductors having extremely high pinning force. In an usual permanent magnet, the magnetic field obtainable therefrom is 1 Tesla at best. However, those obtained by strong magnetization of superconductors or combinations of such superconductors with soft magnetic materials such as soft iron and ferrites can easily provide a magnetic field exceeding 1 Tesla. Furthermore, since such magnets obtained from superconductors lose magnetism together with superconductivity at a critical temperature or higher, they are safe and provide a favorable operability.

As was described above, the present invention can be practiced with ease and enables storage of energy at an extremely high density which have never been achieved by the conventional physical means of storing energy.

While the invention has been described in detail and with reference to specific embodiments thereof, it will be apparent to one skilled in the art that various changes and modifications can be made therein without departing from the spirit and scope thereof.

What is claimed is:

1. An energy storage device comprising:
    at least one first object rotatable around an axis and having at least one permanent magnet to form a magnetic field;
    at least one second object located adjacent to but spaced apart from said first object, said second object including superconductive means, with at least one superconductor, for generating a superconductive field and levitating said first object by an interaction between said superconductor and said magnetic field;
    rotating means for rotating said first object by exerting an electromagnetic reaction to said first object; and
    converting means for converting rotational energy of said first object to an electrical energy.

2. The energy storage device as claimed in claim 1, wherein, the first object is incorporated between two or more of said second objects.

3. The energy storage device as claimed in claim 1, wherein, at least a hole is provided in the second object.

4. The energy storage device of claim 1 further comprising depressurization means for maintaining a pressure, in a region surrounding said first object, no greater than an ambient atmospheric pressure at a location of said energy storage device.

5. The energy storage device of claim 1, wherein the first object is substantially disk shaped, and said first object comprises:
    a first magnetic plane which generates a magnetic field having a polarity of either N or S; and
    a second magnetic plane which generates magnetic fields having alternating polarities and which peripherally surrounds the first magnetic plane.

6. The energy storage device as claimed in claim 1, wherein, the first object is substantially disk shaped, said first object having a hollow portion at the center thereof and comprising:
    a first magnetic plane which generates a magnetic field having a polarity of either N or S; and
    a second magnetic plane which generates magnetic fields having alternating polarities and which peripherally surrounds the first magnetic plane.

7. The energy storage device of claim 1 wherein the second object is formed by coiling at least one of a superconductor wire and a superconductor tape into a multilayered structure.

8. The energy storage device of claim 1, wherein:
    a groove is provided along the outer periphery of the first object, and at positions sandwiching said groove are provided surfaces having each magnetic fields having a polarity reverse to each other, and
    said converting means is provided inside said groove.

9. The energy storage device as claimed in claim 1, wherein, a further superconductor is incorporated in the first object, on the surface which generates the magnetic field.

10. The energy storage device of claim 1 wherein said converting means is provided at a variable distance from the first object.

11. The energy storage device of claim 1 wherein each said first object has a plane surface having said permanent magnet therein and said planes each generate magnetic fields having alternating polarities, and the second object is established in such a manner that it faces said planes which generate the magnetic field.

12. The energy storage device of claim 1, wherein said superconductor comprises a soft magnetic material formed on a surface thereof.

13. The energy storage device as claimed in claim 1, wherein, the first object comprises multiple layers to form a column-like structure.

14. The energy storage device of claim 13, wherein said multiple layers of said first object all rotate about said axis of rotation.

15. A method of converting energy, which converts an electric or a magnetic energy into a kinetic energy, said method comprising the steps of:
    providing an operative superconductor arrangement including a superconductor;
    rotating an object by applying an alternating magnetic field to a magnetism-generating plane established on a surface of an object levitated by the interaction between the superconductor and a permanent magnet, said object being levitated without using any direct mechanical support.

16. A method of converting energy which converts a rotational energy into an electrical energy, said method comprising the steps of:
    providing a rotatable object having a surface;
    providing an operative superconductor arrangement including a superconductor;
    levitating said rotatable object without direct mechanical support and rotating said object;
    generating an alternating magnetic field on said surface of said object levitated by an interaction between a superconductor and at least one permanent magnet; and
    bringing close to said surface of said object a device which converts said alternating magnetic field to an electric energy.

* * * * *